United States Patent [19]

Silver

[11] Patent Number: 4,775,227
[45] Date of Patent: Oct. 4, 1988

[54] ELECTROCHROMIC DEVICE

[75] Inventor: Jack Silver, London, England

[73] Assignee: National Research Development Corporation, London, England

[21] Appl. No.: 870,033

[22] Filed: Jun. 3, 1986

[30] Foreign Application Priority Data

Jun. 20, 1985 [GB] United Kingdom ............... 8515677

[51] Int. Cl.$^4$ ................................................. G02F 1/01
[52] U.S. Cl. .................................................. 350/357
[58] Field of Search ........................... 350/357; 340/785

[56] References Cited

U.S. PATENT DOCUMENTS

| | | | |
|---|---|---|---|
| 4,184,751 | 1/1980 | Nicholson | 350/357 |
| 4,306,774 | 12/1981 | Nicholson | 350/357 |
| 4,432,612 | 2/1984 | Nicholson et al. | 350/357 |
| 4,474,433 | 10/1984 | Nicholson et al. | 350/357 |
| 4,571,029 | 2/1986 | Skotheim et al. | 350/357 |

FOREIGN PATENT DOCUMENTS 0011326 1/1982 Japan.
2087582 5/1982 United Kingdom.

Primary Examiner—Eugene R. Laroche
Assistant Examiner—Nathan W. McCutcheon
Attorney, Agent, or Firm—Murray and Whisenhunt

[57] ABSTRACT

An electrochromic device consists of the layers: tin-oxide-coated glass; rare earth diphthalocyanine (REDPC); membrane electrolyte; REDPC; tin-oxide-coated glass. The REDPC is the electrochromic layer and contains a mixture of rare earths as obtained from a natural deposit without being individually separated. The REDPC is preheated to purify it and then sublimed into position as the device is assembled.

The device is driven by a controller which is limited to the voltage range +2V to −1V, whereby only the colors red, green and blue are obtainable, that is, although the REDPC at −1.5V would show purple, this is deliberately foregone to prolong its life.

The REDPC may be further mixed with tin phthalocyanine chloride or ruthenium, iron, zinc or cobalt phthalocyanine.

7 Claims, 1 Drawing Sheet

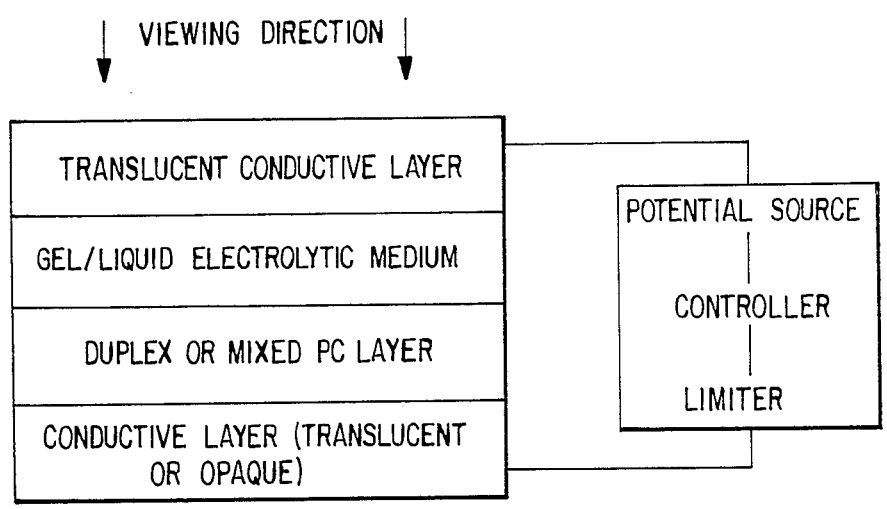

ELECTROCHROMIC DEVICE

This invention relates to an electrochromic device.

The present invention provides an electrochromic device comprising a conductive layer, bearing an electrochromic layer comprising a metal phthalocyanine capable of the colour changes red⟵⟶green⟵⟶blue⟵⟶purple, itself bearing an electrolytic medium (e.g. liquid or solid) contacting the electrochromic layer, and a conductive layer overlying the electrolytic medium, at least one of the conductive layers being translucent, and preferably one or both conductive layers being electronically conductive, and a controller which applies a potential between the two conductive layers sandwiching the other layers, the potential being limited to within the range red⟵⟶green⟵⟶blue, said range typically being from $+2V$ to $-1.0V$, more preferably from $+2V$ to $-0.8V$, the device being characterised in that the electrochromic layer is a duplex or mixed layer of $APc_2$ with at least one of $MPc$, $SnPcCl_2$ and another $APc_2$, where $M=Ru$, $Fe$, $Zn$ or $Co$ or mixtures thereof, and $A=$ any rare earth (including for this purpose Sc, La and Y) or mixtures thereof, and $Pc=$ phthalocyanine. A bright opaque ion conductor such as hydrogen uranyl phosphate, conducting protons, would suffice for at least the red⟵⟶green colour change. The disproportionately damaging effect of forcing such a material into its purple colour (at about $-5V$) had not hitherto been appreciated.

The translucent electronically conductive layer may be a doped tin-oxide-coated glass or a thin metal film.

The mixed layer may thus comprise a mixture of rare earth diphthalocyanines in which mixture at least three rare earth elements account for at least 10 weight percent each of the total rare earths; the mixture may contain rare earth elements in substantially the proportions occurring in a natural deposit, such as the proportions occurring naturally in monazite, bastnaesite or xenotime or mixtures thereof. Examples of such mixtures are (i) 'light fraction' and (ii) 'heavy fraction', which are composed as follows, by weight:

| (i) | lanthanum oxide | 37% |
|---|---|---|
|  | cerium oxide | 3% |
|  | praseodymium oxide | 15% |
|  | neodymium oxide | 25% |
|  | samarium oxide | 4% |
|  | others | 16% |
| (ii) | dysprosium oxide | 30% |
|  | holmium oxide | 10% |
|  | erbium oxide | 25% |
|  | thulium oxide | 4% |
|  | ytterbium oxide | 15% |
|  | lutetium oxide | 4% |
|  | yttrium oxide | 5% |
|  | others | 7% |

It has been customary to use single rare earths, which have been laboriously and expensively purified, in order to ensure sharp spectral absorption peaks. This need has never been questioned, and we have found that the peaks for the various rare earth or lanthanide diphthalocyanines, though different, are sufficiently close that mixtures give not only adequately clear but even more pleasing colours, especially mixtures of only 'light' (atomic number up to gadolinium) or (slightly more preferably) of only 'heavy' (atomic number of terbium or greater) rare earths. This finding, that mixtures are perfectly satisfactory, can lead to a cost reduction, as regards the rare earth content, of two or three orders of magnitude. Moreover, the colour intensity shows less decline with use of the device when mixed rare earth diphthalocyanines are used. A mixture of 'heavy' $APc_2$ further comprising either $SnPcCl_2$ or $MPc$ is especially preferred, for strong and unusual colours.

In the manufacture of the electrochromic layer, it is useful to preheat the subliming material first, to drive off impurities e.g. 130° C. for 1-2 days; the conditions depend on the vacuum used, for example at $10^{-4}$ torr a period of 1-2 minutes is suitable, as may be checked by trial and error. It appears that such heating, in driving off impurities (such as polymers formed by non-metal-bearing phthalocyanine molecules), ensures less incorporation of such impurities in the layer, so improving the performance. Thus, after such heating, devices can be laid down by sublimation, forming layers which need no subsequent treatment.

The invention will now be described by way of example, with reference to the accompanying FIGURE showing an embodiment of the device.

As already mentioned, mixtures of rare-earth diphthalocyanines are advantageous, and may be synthesised as follows:

One equivalent of a mixed rare-earth acetate (prepared by double decomposition from the starting mixed rare-earth material) is ground up with a slight excess of eight equivalents of phthalonitrile (1,2-dicyanobenzene). This mixture is than heated in an open vessel (3-4 hours at 300° C.) until a very dark melt, appearing almost purple-black, is produced. The melt is then allowed to cool to room temperature and ground to a fine powder. The powder is refluxed with acetic anhydride, filtered and the remaining powder washed with cold acetone. The required product remains undissolved at this stage. It is extracted with dimerhyl formamide solvent (DMF) and applied to a short column (slurry in DMF) after first reducing the volume of the DMF extracts by rotary evaporation (90°-100° C.). The column packing is 70-230 B.S. mesh silica gel or activated neutral alumina (such as Brockman (Trade Mark) Grade 1).

The majority of remaining impurity is removed by eluting the column with methanol. The required product is then obtained by unpacking the column and extracting with DMF or run through with trichloromethane, which dissolves the material. The extracts are rotary evaporated to dryness immediately and finally dried in an oven (120° C., 4 hours) to give, with DMF, a dark blue solid microcrystalline material, or with $CHCl_3$ a green material. At this stage, the sample is now pure enough to make reasonable electrochromic devices. Yields are 10-15%.

Use of acetonitrile in place of DMF througout can be more economical in terms of solvent, and moreover much of it can be recovered. In particular, the purification can be performed in one column using methanol as the eluant. First a green band is eluted (waste). Then an azure blue band, the required product, is eluted, and is thus collected quantitatively.

Such mixtures can be dissolved in dimethylformamide and the solutions sprayed onto preheated tin-oxide-coated glass, but this has not proved the best method of deposition. Sublimation of the solid mixture under vacuum onto tin-oxide-coated glass or gold-coated glass (as the electronically conductive transparent substrate)

proved successful. For this purpose, it was mixed with dichlorophthalocyaninato tin (IV) (PcSnCl$_2$). The latter material acted both as a carrier to aid sublimation of the lutetium phthalocyanine and as a spacer in the crystal lattice of the deposited lutetium phthalocyanine, allowing the two rings of the latter to move during the activity of the device. The PcSnCl$_2$ is itself electrochromic and undergoes a colour change from blue to purple at about 2.5 V. The sublimation source/target spacing is adjusted by trial and error for best results.

Other rare-earth diphthalocyanines can also be produced as even films by vacuum sublimation. A suitable film of area 64 cm$^2$, pale blue, required 15 mg of compound.

This film, mounted on its glass substrate, is placed in a transparent container which can be filled with a liquid electrolyte, which electrolyte however cannot contact the conductive layer on the glass. The electrolyte may be a polyhydric alcohol (e.g. ethylene glycol) or, more preferably, propylene carbonate/tetraethylammonium fluoride; other suitable electrolytes are (i) 25% water, balance ethylene glycol and tetraethylammonium fluoride and (ii)(less preferable) 25% water, balance ethylene glycol and lithium chloride, the ionic salt being present in about 5 weight %. The electrolyte does not have to be anhydrous, as has been recommended previously.

These electrolytes may be applied instead to the film in gel form, e.g. stiffened with agar. Current may be fed to the electrolyte by a platinum wire probe. Colour cnange is localised to that part of the film close to the probe; thus it is possible to 'write' across the film by moving the probe across the gel.

The diphthalocyanine ring may be suostituted by sterically bulky groups (i.e. at least the size of chloro-). This gives inner parts of the molecule, in a crystal, more room to flex (on color change) without disturbing the crystal structure, and hence aids durability of adhesion of a sublimed film on a conductive glass substrate.

In a different embodiment, made as a curiosity, the following structure operated satisfactorily when the membrane was slightly damp.

Glass|Rare Earth DPC|Membrane Electolyte|Rare Earth DPC|Glass

The glass in both cases is conductively coated, with tin-oxide, between which coatings a potential can be applied. The membrane is of perfluorosulphonic acid, which is a solid-state electrolyte acting as an ion-exchanging medium, being "Nafion", a trade mark of du Pont. The Nafion is prepared by boiling it successively for 1 hour in a saturated aqueous solution of barium nitrate and in dilute sulphuric acid, to precipitate barium sulphate within the membrane to opacify it, otherwise the colours of the two Rare Earth DPC layers will conflict.

In a further embodiment, glass coated with a translucently thin interference layer of aluminium is steeped in electrolyte, the said electrochromic layer being applied onto the steeped aluminium, and tin-oxide-coated glass being fixed over rhe layer. The aluminium-coated glass may itself be replaced by (ikewise steeped) tin-oxide-coated glass. The latter may be made by evaporating indium and stannous chloride in aqueous solution on the glass under an oxygen atmosphere.

A controller is connected to the couductive layers so as to apply a potential between them and thus to the electrochromic material. This potential is limited to the range +2 V to −1 V in this example, to avoid forcing the material into its purple colour. The controller acts also as a source of current, which flows corresponding to the potential, providing a source of electrons.

The actual colours obtained at the specified voltages on the specified materials are as follows:

| bis(phthalocyaninato)lutetium(III): | | |
|---|---|---|
| red | +2V | |
| green | +½V | |
| blue | −1V | |
| (purple | −2V; | purple is not available in devices according to the invention, the controller being limited to a less negative potential). |
| bis(phthalocyaninato)europium(III): | | |
| red | +2V | |
| green | +½V | |
| blue | −1V | |
| (purple | −2V; | purple is not available in devices according to the invention, the controller being limited to a less negative potential). |

The device according to the invention may be used as an optical filter. One use of this filter would be in front of a monochromatic television receiving succesively frames in the three primary colours which add up to form a colour image; the filter would be showing those three colours synchronised with the respective images, to build up the full colour image. Colours of various bandwidths are available in each of the colours red, green and blue. Where SnPcCl$_2$ is present, a rich red tending to purple is obtainable, this colour not being otherwise available at voltages within the permitted range according to the invention. Where CoPc is a predominant component, the colour sequence becomes

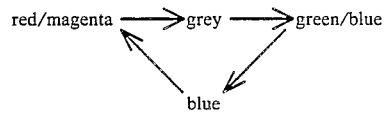

This grey is effectively clear or neutral if the illumination level is sufficient.

The device may also be used for electrochromic data storage, for mounting on or incorporation in electrochromic credit cards (which will be scanned in a low-voltage verifier at the point of sale) and for other security applications.

A device according to the invention in translucent form could have a colour image electrochromically written onto it, such device then being capable of projection in the same way as a photographic slide.

Another application for devices according to the invention is as sunglass lenses or filters, which may be altered in colour at the wearer's whim as often as desired. More general applications as optical wavelength filters are of course possible.

I claim:

1. An electrochromic device comprising a conductive layer, bearing an electrochromic layer comprising a metal phthalocyanine capable of the color changes red ⟷green ⟷blue⟷purple, itself bearing an electrolytic medium contacting the electrochromic layer, and a conductive layer overlying the electrolytic medium, at least one of the conductive layers being translucent, and a controller which applies a potential between the two conductive layer sandwiching the other layers, characterized in that the controller limits the potential between the conductive layers to within the range red⟷green⟷blue of from $+2$ V to $-1.0$ V, the device being characterized in that the electrochromic layer is a duplex or mixed layer of $APc_2$ with at least one of $MPc$, $SnPcCl_2$ and another $APc_2$, where $A$=any rare earth (including Sc, La and Y) or mixtures thereof, $M$=Ru, Fe, Zn or Co or mixtures thereof, and Pc=phthalocyanine, at least three rare earth elements in said electrochromic layer accounting for at least 10 weight percent each of the total rare earths.

2. An electrochromic device according to claim 1, wherein the electrolytic medium is liquid or solid.

3. An electrochromic device according to claim 1 or 2, wherein one or both of the conductive layers are electronically conductive.

4. An electrochromic device according to claim 3, wherein the electronically conductive layer(s) is (are) hydrogen uranyl phosphate.

5. An electrochromic device according to claim 1, wherein the controller limits the potential to within the range $+2$ V to $-0.8$ V.

6. An electrochromic device according to claim 1, wherein the translucent electronically conductive layer is a doped tin-oxide-coated glass or a thin metal film.

7. An electrochromic device according to claim 1, in which the electrochromic layer contains rare earth elements in substantially the proportions occurring in a natural depositor mixtures of natural deposits.

* * * * *